United States Patent
Desantes Fernandez et al.

(10) Patent No.: US 10,684,195 B2
(45) Date of Patent: Jun. 16, 2020

(54) DEVICE FOR CONDITIONING THE ATMOSPHERE IN TESTS OF ALTERNATIVE INTERNAL COMBUSTION ENGINES, METHOD AND USE OF SAID DEVICE

(71) Applicant: UNIVERSIDAD POLITECNICA DE VALENCIA, Valencia (ES)

(72) Inventors: Jose Maria Desantes Fernandez, Valencia (ES); Jose Galindo Lucas, Valencia (ES); Francisco Payri Gonzalez, Valencia (ES); Pedro Piqueras Cabrera, Valencia (ES); Jose Ramon Serrano Cruz, Valencia (ES)

(73) Assignee: Universidad Politecnica de Valencia, Valencia (ES)

( * ) Notice: Subject to any disclaimer, the term of this patent is extended or adjusted under 35 U.S.C. 154(b) by 369 days.

(21) Appl. No.: 15/545,132

(22) PCT Filed: Jan. 12, 2016

(86) PCT No.: PCT/ES2016/070008
§ 371 (c)(1),
(2) Date: Jul. 20, 2017

(87) PCT Pub. No.: WO2016/116642
PCT Pub. Date: Jul. 28, 2016

(65) Prior Publication Data
US 2018/0283990 A1    Oct. 4, 2018

(30) Foreign Application Priority Data

Jan. 21, 2015 (ES) .................................. 201530075

(51) Int. Cl.
*G01M 15/09* (2006.01)
*G01M 15/02* (2006.01)
*G01M 15/04* (2006.01)

(52) U.S. Cl.
CPC ............ *G01M 15/09* (2013.01); *G01M 15/02* (2013.01); *G01M 15/04* (2013.01); *G01M 15/048* (2013.01)

(58) Field of Classification Search
CPC ..... G01M 15/09; G01M 15/048; F02M 26/04
See application file for complete search history.

(56) References Cited

U.S. PATENT DOCUMENTS 3,996,793 A * 12/1976 Topper ................. G01M 15/00
                                                                 73/118.02
10,379,002 B2 * 8/2019 Desantes Fernandez ...................
                                                                 G01M 15/02

(Continued)

FOREIGN PATENT DOCUMENTS

CN        201600243 U     10/2010
KR      1020120011565 A     2/2012

(Continued)

*Primary Examiner* — Mark A Laurenzi
*Assistant Examiner* — Jessica L Kebea
(74) *Attorney, Agent, or Firm* — Wiggin and Dana LLP; Gregory S. Rosenblatt; Jonathan D. Hall

(57) ABSTRACT

The invention relates to a device for conditioning the atmosphere when testing engines, comprising an inlet duct connected to an engine intake, an outlet duct connected to the exhaust of the engine, a communication duct that connects the inlet duct to the outlet duct, a bypass valve in the inlet duct, a super-charging turbo assembly in the inlet duct, a heat exchanger in the outlet duct, and a turbocharger after the heat exchanger. The device further comprises a first three-way valve that connects the inlet duct to the outlet duct, an on/off valve in the outlet duct, a second three-way valve in the outlet duct, a control valve in a duct that connects the outlet duct to the atmosphere, and a section of the outlet duct that connects the exchanger to the communication duct.

16 Claims, 3 Drawing Sheets

(56) References Cited

U.S. PATENT DOCUMENTS

| | | |
|---|---|---|
| 2004/0186699 A1 | 9/2004 | Glinsky |
| 2013/0306159 A1 | 11/2013 | Payri Gonzalez et al. |
| 2016/0349147 A1 | 12/2016 | Desantes Fernandez et al. |
| 2017/0122228 A1* | 5/2017 | Hellstrom ............. F02D 9/1055 |

FOREIGN PATENT DOCUMENTS

| | | | |
|---|---|---|---|
| WO | 2008036993 A2 | 4/2008 | |
| WO | WO-2012104454 A1 * | 8/2012 | ....... F02M 35/10242 |
| WO | WO-2019114935 A1 * | 6/2019 | ......... F02M 25/0221 |

\* cited by examiner

US 10,684,195 B2

DEVICE FOR CONDITIONING THE ATMOSPHERE IN TESTS OF ALTERNATIVE INTERNAL COMBUSTION ENGINES, METHOD AND USE OF SAID DEVICE

TECHNICAL FIELD

The present invention generally relates to the field of testing combustion engines, and more specifically to a device for conditioning the atmosphere while testing combustion engines.

PRIOR ART

Testing and characterizing reciprocating internal combustion engines in test benches require in many circumstances precise pressure and/or temperature control, both in the intake and in the exhaust. This is the case, for example, of testing campaigns intended for calibrating engine control with altitude, cold-starting studies, repeatability of reference conditions in testing campaigns extending over time, etc.

In many cases the problem raised is to obtain control over pressure so that it is less than atmospheric pressure, i.e., for simulating a high altitude situation. This case occurs, for example, when engine operation is to be studied at a level with a higher altitude than that of the laboratory in which testing is performed, or in the case of studying engines and aviation equipment. However, in other cases it is also desirable to reproduce low altitude conditions by increasing atmospheric pressure, for example when sea level conditions are to be reproduced in a testing room which is geographically located at a high altitude, or when engine behavior inside a mine below sea level is to be studied.

Some methods are already known in the art for performing this type of atmospheric condition simulation.

For example, patent document ES2398095 A1, belonging to the same applicants as the present patent document, discloses an installation for simulating the pressure and temperature conditions of the air drawn in by a reciprocating internal combustion engine operating at a height. Said installation comprises, inter alia, a radial centripetal turbine for expanding airflow to the pressure and temperature of the air drawn in by the reciprocating internal combustion engine. However, the installation disclosed in patent document ES2398095 A1 is primarily dedicated to studying higher altitudes for the application thereof in aviation, but not to studying the operation of engines in lower altitude conditions, such as mines located below sea level.

Patent document WO2008036993 A2 discloses a method and device for supplying conditioned combustion gas to an internal combustion engine. The exhaust gases can be mixed with the air that is introduced in the intake of the engine. The internal combustion engine exhaust gases are discharged through an exhaust pipe by means of an intake system for the combustion engine exhaust gas, preferably a system including a filter, a diluting duct and a fan.

Patent document ES2485618, also belonging to the same applicants as the present patent document and considered the closest prior art with respect to the present invention, discloses an installation for simulating the pressure and temperature conditions of the air drawn in by a reciprocating internal combustion engine operating at heights that are both higher than and lower than the height at which the installation is located. However, the installation of patent document ES2485618 is relatively complex, whereby increasing its manufacturing difficulty, and therefore its cost. Furthermore, this complexity results in pressure drops, so it does not allow simulating small differences in altitude between the altitude at which the installation is located and the altitude to be simulated in the reciprocating internal combustion engine.

Therefore, although some methods and devices are known for providing a simulation of atmospheric conditions at different altitudes for testing internal combustion engines, there is still a need in the art for alternative methods and devices that provide advantages with respect to the prior art. For example, it would be desirable to have a device which allows precisely simulating small differences in altitude between the location of the installation in which testing is performed and the altitude to be simulated in the combustion engine.

DISCLOSURE OF THE INVENTION

In a first aspect, the present invention discloses a device for conditioning the atmosphere for testing combustion engines which solves the aforementioned drawbacks of the prior art. To that end, the device of the present invention comprises:
- an inlet duct arranged for being connected at a first end to an intake of a combustion engine to be tested and which draws in air from the external atmosphere through a second end;
- an outlet duct arranged for being connected at a first end to the exhaust of the combustion engine and which expels exhaust gases into the atmosphere through a second end;
- a first communication duct communicating the inlet duct with the outlet duct close to its respective first ends, such that the intake of the device is in communication with the exhaust thereof;
- a bypass valve arranged in the inlet duct;
- a super-charging turbo assembly which diverts the airflow in the inlet duct circulating towards the bypass valve, the turbo assembly comprising a turbine coupled to a dissipation system for dissipating the energy generated during expansion, the bypass valve and the turbine being able to be controlled to obtain a desired pressure and airflow value in the inlet duct;
- a heat exchanger in the outlet duct for cooling the exhaust gases to a safe temperature; and
- a turbocharger in the outlet duct downstream of the heat exchanger, charged by turbocharger charging means, to control, together with the turbine and the bypass valve, the pressure of the intake air and the intake airflow.

The device of the present invention is characterized in that it further comprises:
- a first three-way valve that connects the inlet duct upstream of the bypass valve with the outlet duct upstream of the turbocharger through a second communication duct;
- an on/off valve in the duct between the heat exchanger and the point of connection of the outlet duct with the second communication duct;
- a second three-way valve that connects the outlet duct downstream of the turbocharger and the outlet duct, between the heat exchanger and the on/off valve;
- a control valve in a duct that connects the outlet duct with the atmosphere; and
- a section of the outlet duct that connects the heat exchanger with the first communication duct between the connection of the inlet duct and the connection of the duct.

Therefore, the configuration of the set of three-way valves, bypass valves and the on/off valve allows use of the device for increasing or reducing inlet air pressure with respect to atmospheric air, as well as easily switching from the inlet air pressure increase mode to the inlet air pressure reduction mode. Furthermore, said novel configuration of valves in the device of the present invention allows performing temperature variations simulating small height variations, for example of +/−200 m, +/−100 m, +/−50 m or even less, with respect to the height at which the device is located.

In a second aspect, the present invention also discloses a method for conditioning the atmosphere for testing combustion engines by means of a device according to the first aspect of the present invention, wherein said method comprises the steps of:

subjecting atmospheric inlet air to a pressure variation step;
diverting inlet air towards the outlet in order to put exhaust gases in direct communication with the inlet air;
introducing inlet air subjected to pressure variations at the intake of an engine to be tested;
reducing the temperature of the exhaust gases to a safe temperature for the passage thereof through a turbocharger; and
expelling exhaust gases from the engine being tested into the atmosphere.

Therefore, by using the device according to the first aspect of the present invention, the method of the invention allows performing pressure variations simulating not only large but also small height variations.

In the method of the invention, the inlet air pressure variation step is performed by means of the combined action of a turbocharger, a turbine and a bypass valve controlling the amount of inlet air.

Finally, according to a third aspect of the present invention, the present invention also discloses the use of a device according to the first aspect of the present invention for conditioning pressure from the atmosphere when testing combustion engines by means of pressure variations simulating very small height variations, for example of +/−200 m, +/−100 m, +/−50 m or even less, with respect to the height at which the device is located.

BRIEF DESCRIPTION OF THE DRAWINGS

The present invention will be better understood in reference to the following drawings illustrating preferred embodiments of the invention which are provided by way of example and must not be interpreted as being limiting of the invention in any way.

DETAILED DISCLOSURE OF PREFERRED EMBODIMENTS

Figure 1:
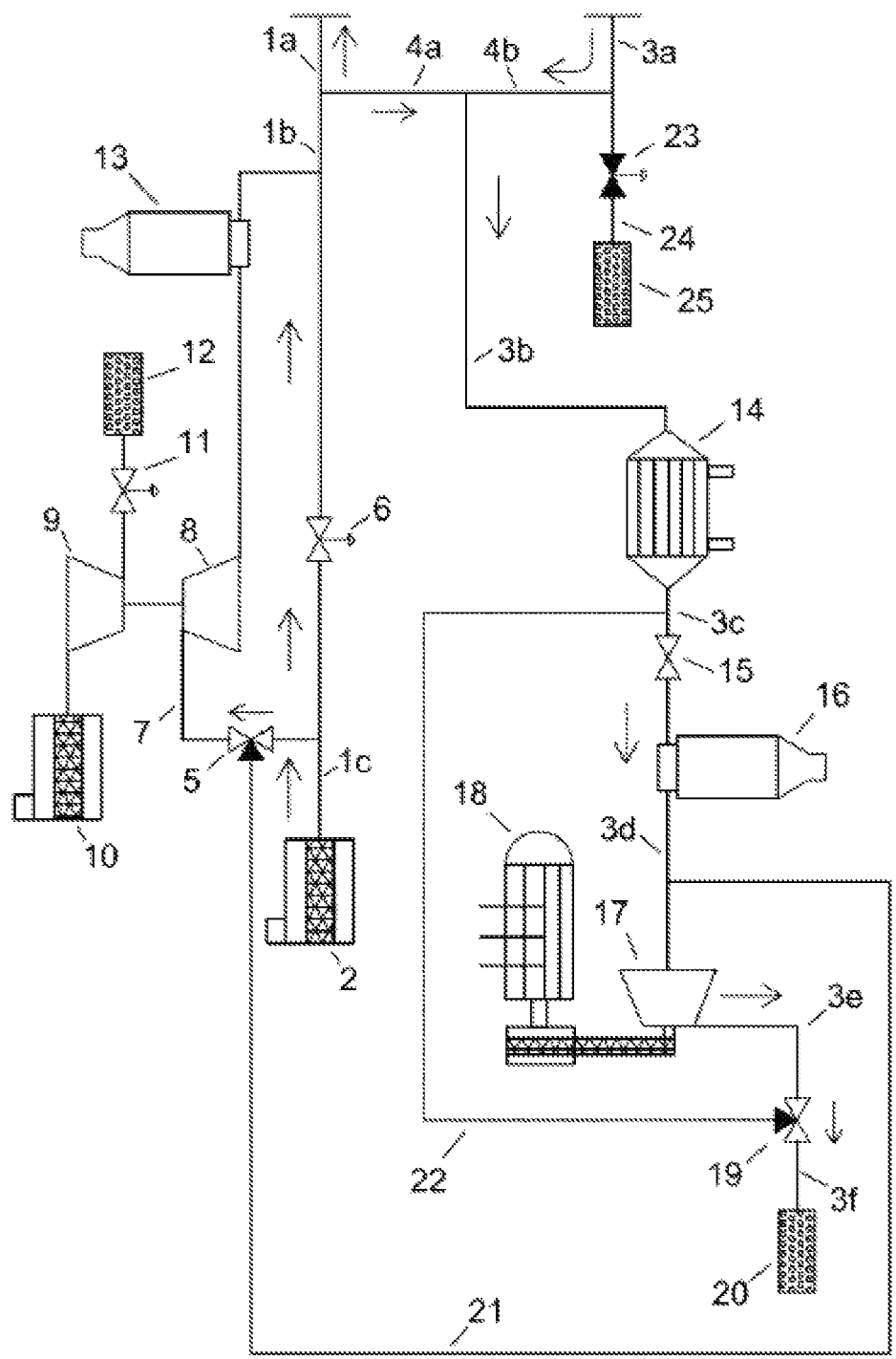
FIG. 1 shows a diagram of the device according to the first embodiment of the present invention, according to a first operating mode.

A device according to a preferred embodiment of the present invention will be described below according to two different operating modes, referring to FIGS. 1 and 2, respectively. In FIG. 1, the device is used to simulate a higher altitude with respect to the geographic level at which the combustion engine is being tested, i.e., at a lower pressure. This is the case for example of operating the engine in high mountain areas.

Figure 2:
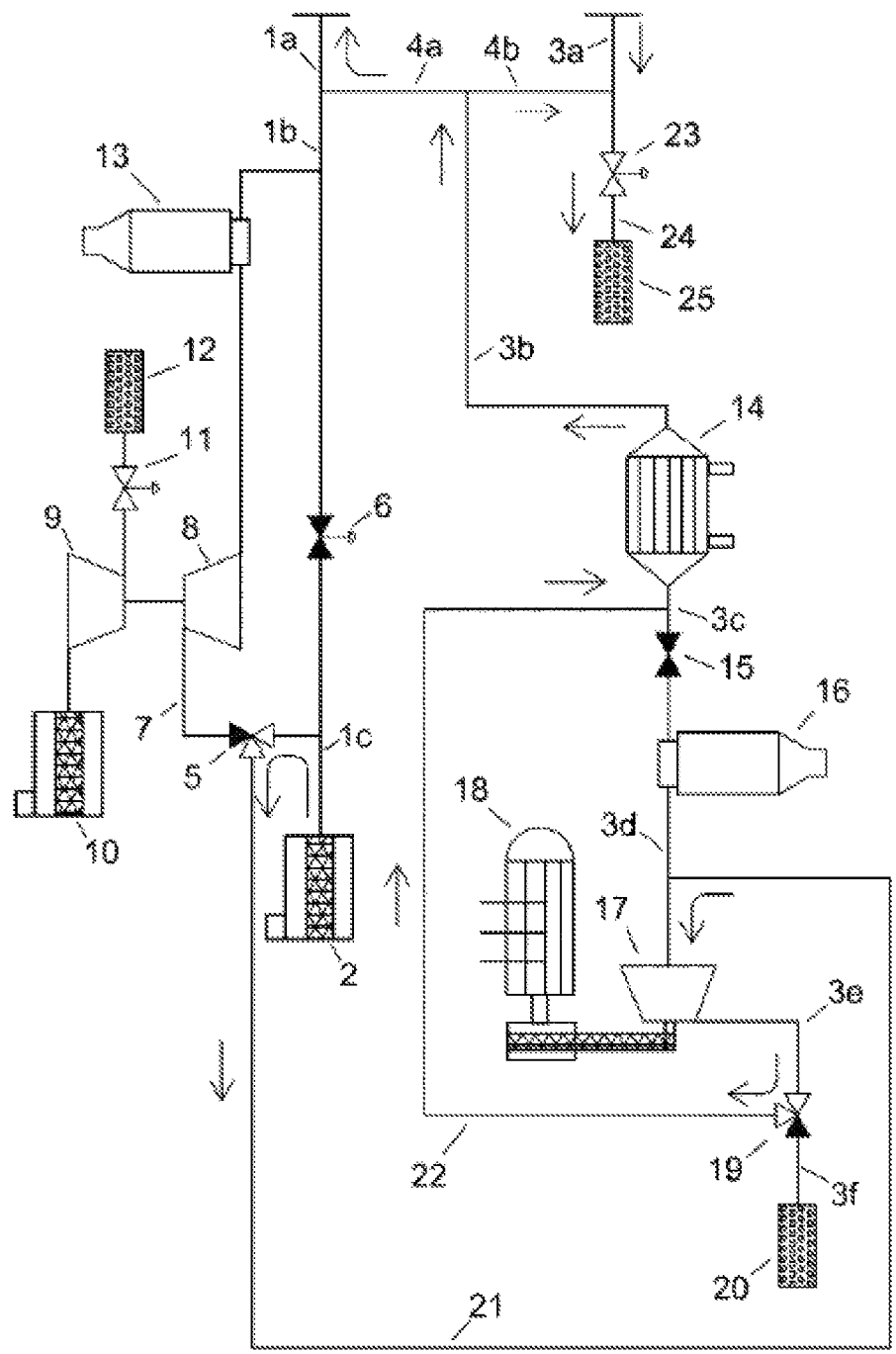
FIG. 2 shows a diagram of the device according to the first embodiment of the present invention, according to a second operating mode.

In FIG. 2, the device is used to simulate a lower altitude with respect to the geographic level at which the combustion engine is being tested, i.e., at a higher pressure. This is the case of operating the engine at sea level (when the test room is installed at greater heights), for example, or even below sea level, for example, inside mines.

FIG. 1 shows a first preferred embodiment of the invention which allows switching from a vacuum to overpressure without having to change the position of the engine or the position of an air filter (2).

As seen in FIG. 1, the device comprises an inlet duct (1) arranged for being connected at a first end (1*a*) to an intake of a combustion engine (not shown) to be tested. The inlet duct (1) has a filter (2) at a second end (1*c*) through which air is drawn in from the outer atmosphere. The filter (2) allows preventing impurities from entering the device.

The device also comprises an outlet duct (3) arranged for being connected at a first end (3*a*) to the exhaust of the combustion engine and which expels exhaust gases into the atmosphere through a second end (3*f*). The inlet duct (1) and the outlet duct (3) are communicated by means of a first communication duct (4), split into two sections (4*a*) and (4*b*), located close to the first ends (1*a*, 3*a*) of the inlet and outlet ducts, respectively. The intake of the device is thereby in communication with the exhaust thereof.

As they are used throughout the present description, reference numbers 1, 3 and 4 refer to the inlet duct, outlet duct and first communication duct, respectively, in their entirety. When each of these reference numbers is followed by a letter (1*a*, 1*b*, 1*c* . . . ; 3*a*, 3*b*, 3*c* . . . ), it refers to a section of the corresponding duct. This notation is used exclusively for the sake of clarity, and the person skilled in the art will understand that they are not necessarily different ducts but rather sections of one and the same duct.

So in FIG. 1, which represents a case where the device is generating a vacuum, inlet air circulates through the first communication duct (4*a*) from the inlet duct (1) to the outlet duct (3), said air being both air and the difference between the air drawn in by the equipment through the filter (2) and the air required by the engine. There is a mixture of air and exhaust gas in the outlet duct (3*b*) because the air from the inlet duct (1) and the exhaust gas from the engine are mixed in the communication duct (4) and directed to the section of the outlet duct (3*b*). To that end, a control valve (23) (herein described in further detail below) is completely closed.

The device also comprises a bypass valve (6) located in the inlet duct (1).

The device further comprises a super-charging turbo assembly arranged in the inlet duct (1), which diverts the airflow in the inlet duct (1) circulating towards the bypass valve (6). The turbo assembly in turn comprises a turbine (8) coupled to a dissipation system for dissipating the energy generated during expansion. The turbine (8) is preferably a variable-geometry turbine (VGT) and more preferably a radial centripetal-type turbine. The turbine (8) is positioned in a bypass line (7) connecting to the inlet duct at a first point and a second point.

According to the preferred embodiment of the present invention shown in FIGS. 1 and 2, the dissipation system for dissipating the energy generated during expansion in the turbine consists of a radial-flow centrifugal compressor (9).

The compressor (9) is connected to a filter (10) through which it draws in air from the atmosphere and to at least one back pressure valve (11) and a muffler (12) through which the compressor (9) discharges the drawn in air into the atmosphere.

Furthermore, a first three-way valve (5) is located upstream of the turbine (8), said valve (5) being positioned for this configuration such that it allows the passage of air from the inlet duct (1c) to the turbine (8) and prevents the passage thereof to a second communication duct (21), herein described in further detail below.

The bypass valve (6) and the turbine (8) can be controlled to obtain a desired mass flow rate and pressure value in the inlet duct (1b). Therefore, the inlet airflow in the inlet duct (1b) located downstream of the first three-way valve (5) and the bypass valve (6) is a mixture of air that expands in the turbine (8) and of air that is diverted through the bypass valve (6).

Finally, a condensate separator (13) is arranged downstream of the turbine (8), before the drawn in air passes into the inlet duct (1b) again.

The outlet duct (3) in the vacuum-generating operating mode shown in FIG. 1 is described next. In this case, the control valve (23) is closed and an on/off valve (15) is open. Therefore, the exhaust gases from the outlet duct (3a), diluted with inlet air from the first communication duct (4a), are cooled (14) in a heat exchanger to a temperature safe for introduction into a turbocharger (17).

The heat exchanger (14) can use any suitable fluid as the coolant fluid, such as tap water at room temperature.

After the heat exchanger (14) and before the turbocharger (17), the exhaust gases are passed through a condensate separator (16).

The turbocharger (17) is charged by turbocharger charging means, consisting of at least one electric motor (18) in this case. The turbocharger (17) draws in the cooled mixture of air and exhaust gases from the outlet duct (3d) in order to remove said mixture from the device. The electric motor (18) controls the rotational speed of the turbocharger (17) until a given desired value of the mass flow rate and pressure in the air that is taken in is reached, controlling these conditions together with the turbine (8) and the bypass valve (6).

The mixture of air and exhaust gases drawn in by the turbocharger (17) passes through the outlet duct (3e), where a second three-way valve (19) prevents its passage towards a duct (22) and allows its passage towards the outlet duct (3f), to be discharged in the end into the atmosphere through a muffler (20).

Now referring to FIG. 2, operation of a device according to the same embodiment shown in FIG. 1 is described, but this time operating in an overpressure generating mode. In other words, in the operating mode of FIG. 2 the device is simulating atmospheric conditions at a level with an altitude that is less than that of the room where the test is being performed, i.e., at a higher pressure.

The elements in FIG. 2 are the same as those shown in FIG. 1 and have the same reference numbers, so they will not be described in further detail. The only difference between FIGS. 1 and 2 is the position of the opening of the valves and therefore the path followed by the air as it passes through the installation.

Therefore, to work at a pressure that is higher than atmospheric pressure, i.e., in the case of an overpressure-generating operation of the device, the air is drawn in through the air filter (2). In this case, the first three-way valve (5) is closed in the direction of entry into the turbine (8) and open for diverting the flow towards a second communication duct (21), which connects the inlet duct (1c) upstream of the bypass valve (6) with the outlet duct (3d) upstream of the turbocharger (17). The bypass valve (6) is closed, preventing the passage of air towards the duct (1b).

Furthermore, the valve (15), which is located in the duct (3c) between the heat exchanger (14) and the point of connection of the outlet duct (3d) with the second communication duct (21), is closed, such that the only free path for the airflow that is drawn in is through the turbocharger (17). The second three-way valve (19), which connects the outlet duct (3e) downstream of the turbocharger (17) and the outlet duct (3c) between the heat exchanger (14) and the on/off valve (15), is closed in the direction towards the duct (3f), such that the airflow that is drawn in is diverted through the duct (22) and discharged into the duct (3c).

Therefore, the air drawn in from the duct (22) is discharged into the heat exchanger (14) and does not recede because the valve (15) is closed, as mentioned above. The only free path for the flow is towards the inlet duct (1a) coupled to the intake of the engine.

In addition, the exhaust gases of the engine are discharged into the outlet duct (3a) and mixed with the drawn in dilution air from the duct (4b). Finally, the gases exit into the atmosphere through the control valve (23), arranged in a duct (24) that connects the outlet duct (3a) with the atmosphere, and that is at least partially open, and through a muffler (25).

It can be seen that a section of the outlet duct (3b) connects the heat exchanger (14) with the first communication duct (4) at a point between the connection of the inlet duct (1) and the connection of the duct (24).

Therefore, it can be seen that configuration of the set of three-way valves (5, 19), bypass valves (6, 23) and on/off valve (15) allows use of the device for increasing or reducing inlet air pressure with respect to atmospheric air. Switching from one operating mode to another is done in a quick and simple manner by simply acting on this series of valves. Furthermore, the specific arrangement of ducts and valves, herein described in detail above and shown in the attached drawings, provides significant improvements with respect to similar devices known in the prior art. For example, the specific design of the device disclosed in the present invention is simpler than similar devices in the prior art, so it is easier and less expensive to manufacture as well as to automate and be operated by operators.

In addition, in a manner that is very advantageous with respect to the prior art, reducing the design complexity of the device of the present invention with respect to the prior art makes it possible to precisely simulate very small height variations, for example of +/−200 m, +/−100 m, +/−50 m or less, with respect to the height at which the device is located, which was not possible with similar devices in the prior art, for example the device disclosed in patent document ES 2485618.

In fact, the pressure drops experienced by the air as it travels through the device are due to the different mechanical obstacles it encounters (valves, pipe length, etc.). The reduced complexity of the device of the preferred embodiment of the present invention allows reducing these mechanical obstacles, and accordingly allows the device to simulate small pressure variations (which translate into small height variations). Specifically, the bypass valve (6) and the direct path created between the filter (2) and the end (1a) allow improved operation of the device in vacuum mode. In turn, the control valve (23) and the direct path created between the end (3a) and the muffler (25) allow the improved operation of the device in overpressure mode.

In addition, the person skilled in the art will understand that the combined action of the turbine (8) and bypass valve (6) allows cooling inlet air when the device is working in vacuum mode. In addition, when the device is working in overpressure mode, the rotational speed of the turbocharger (17) and the position of the control valve (23) allow controlling (together with the heat exchanger (14)) the temperature of the air with respect to the atmosphere.

Therefore, as they are used herein the terms "conditioning" and "condition" refer to performing pressure variations, temperature variations and a combination of pressure and temperature variations.

Figure 3:
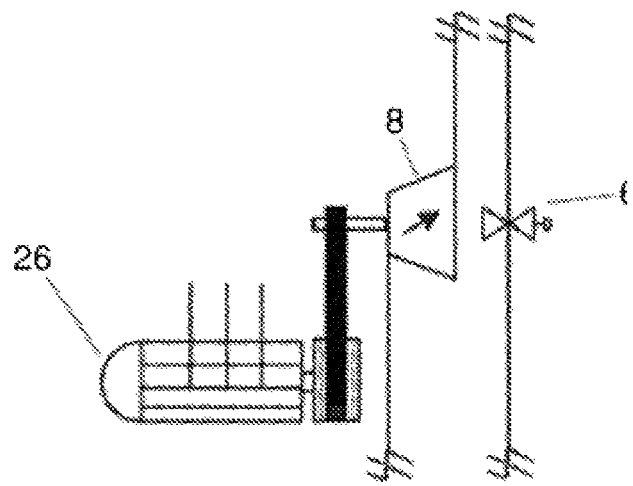
FIG. 3 shows a diagram of an alternative embodiment for dissipating the energy generated during expansion in the turbine of the device of the present invention.

Now referring to the embodiment shown in FIG. 3, it can be seen that the turbine (8) can also be coupled to an electric generator (26) which absorbs the energy obtained during expansion in the turbine (8).

Figure 4:
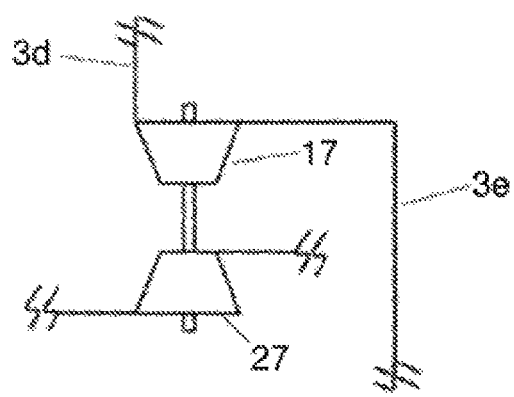
FIG. 4 shows a diagram of an alternative embodiment of the turbocharger of the device of the present invention.

According to another preferred embodiment shown in FIG. 4, the turbocharger charging means consist of a turbine (27). The assembly of the turbine (27) and turbocharger (17) coupled to the same shaft can be a super-charging turbo assembly. The turbine (27) is operated by means of a gas flow in which the gases are generated to that end in a flow bench. In this embodiment of the present invention, the turbine (27) controls the rotational speed of the turbocharger (17) until a given desired mass flow rate and pressure value is achieved in the air that is taken in, controlling these conditions together with the turbine (8) and the bypass valve (6).

As can be inferred from the preceding description, and as mentioned above herein, the device according to the present invention has a series of advantages with respect to the prior art, such as automatic switching from a vacuum to overpressure and the possibility of simulating altitudes close to the geographic level at which the installation described in the present invention is located.

The present invention discloses a method for conditioning the atmosphere for testing combustion engines using a device according to the first aspect of the present invention, wherein said method comprises the steps of:
  subjecting atmospheric inlet air to a pressure variation step;
  diverting inlet air towards the outlet in order to put exhaust gases in direct communication with the inlet air;
  introducing inlet air subjected to pressure variations at the intake of an engine to be tested;
  reducing the temperature of the exhaust gases to a safe temperature for the passage thereof through a turbocharger; and
  expelling exhaust gases from the engine being tested into the atmosphere.

The inlet air pressure variation step in the method of the preferred embodiment of the present invention is performed by means of the combined action of a turbocharger, a turbine and a bypass valve controlling the amount of inlet air.

Therefore, the method of the present invention allows performing pressure variations simulating small height variations, for example of +/−200 m, with respect to the height at which the method is carried out, or even less, for example of +/−100 m, +/−50 m, etc.

According to the present invention, the inlet air pressure variation step can comprise either reducing inlet air pressure or increasing inlet air pressure.

Furthermore, the method of the present invention can also comprise the step of switching between an inlet air pressure increase mode and an inlet air pressure reduction mode. Said switching of the pressure variation mode is done by simply adjusting two three-way valves, two control valves and an on/off valve.

In addition, the method according to the preferred embodiment of the present invention further comprises the step of subjecting the atmospheric inlet air to a temperature variation step. By using the device of the present invention as described above herein, this temperature variation step is performed by means of the combined use of the turbine (8) and bypass valve (6) (vacuum mode) and by means of the combined use of the turbocharger (17), control valve (23) and heat exchanger (14) (overpressure mode).

Finally, the present invention also relates to the use of a device according to the first aspect of the present invention, as defined above in reference to FIGS. 1 to 4, for conditioning pressure from the atmosphere when testing combustion engines by means of pressure variations simulating small height variations with respect to the height at which the device is located.

Comparative data relating to the operation of a device according to the preferred embodiment of the present invention with respect to the operation of a device of the prior art (device from patent document ES2485618) is provided below.

The following table shows the maximum airflow rates that can be reached for different height variations by means of the device of patent document ES2485618 and the device according to the preferred embodiment of the present invention described above.

As explained above, a small height variation corresponds to a small pressure variation. In turn, the greater the airflow the device can generate, the larger the size of the engines that can be tested with it.

| Height variation with respect to the device | Mass flow rate (prior art) | Mass flow rate (present invention) |
|---|---|---|
| +200 m | 400 kg/h | 1300 kg/h |
| +500 m | 600 kg/h | 1200 kg/h |
| +1000 m | 900 kg/h | 1150 kg/h |
| +2000 m | 850 kg/h | 1000 kg/h |
| −200 m | 200 kg/h | 1900 kg/h |
| −500 m | 400 kg/h | 1800 kg/h |
| −1000 m | 650 kg/h | 1700 kg/h |
| −2000 m | 800 kg/h | 1550 kg/h |

As can be seen in the preceding table, for all height variations the device of the present invention allows obtaining much higher mass flow rates than those that could be obtained with the device of patent document ES2485618. Since there is a higher mass flow rate, in the event of a fluctuation, the drawn in pressure does not change and the connection of the engine to the device does not affect operation of the engine itself, which allows simulating small pressure variations (which translate into in small height variations).

For example, a 1.6 L engine moves about 275 kg/h. Therefore, engines larger than this could not really be tested with the device of the prior art. This involves a very limited range of use of the device of the prior art for small heights.

In addition, it can be seen that with the device of the prior art the flow rate increases as the height variation increases to +1000 m, which means that the device is not very operative between zero and that height (1000 m) in the vacuum mode. The same occurs in the case of overpressure to −5000 m (data not shown). With the device of the present invention, it can be seen that the mass flow rate obtained always decreases as the height variation increases, whether this is a positive or negative variation, which is more consistent with what actually happens with engines, and therefore the device of the present invention is more operative.

Although the preceding table shows specific height variation values reaching up to +/−200 m, the person skilled in the art will understand that the data in the preceding table demonstrates the tendency of the device of the present invention to provide a higher mass flow rate than the device of the prior art, regardless of the tested height variation. Therefore, the device of the present invention will also work with even smaller height variations, for example of +/−100 m, +/−50 m, etc.

Although the present invention has been described in reference to preferred embodiments thereof, the person skilled in the art will understand that modifications and variations can be applied to the described embodiments without departing from the scope of the present invention as a result. For example, the turbocharger and turbine could be coupled to other systems providing or dissipating energy, respectively, not necessarily limited to those herein described above.

Likewise, although preferred embodiments of the device of the present invention comprising a single turbine (8), a single bypass valve (6), a single heat exchanger (14) and a single turbocharger (17) have been described, it will be evident for a person skilled in the art that alternative embodiments of the device of the present invention can include several of these elements.

The person skilled in the art will also understand that although the present invention has been described by referring to internal combustion engine testing, said invention can also be applied with minor modifications to the testing of other associated elements which may also have to work at different altitudes (such as for example, air filters, mufflers, and exhaust gas cleaning elements (post-treatment), etc.)

The invention claimed is:

1. A device for when testing a reciprocating internal combustion engine in different atmosphere conditions comprising:
    an inlet duct connected at a first end to the reciprocating internal combustion engine to be tested, wherein air from an environmental atmosphere is drawn to the reciprocating internal combustion engine through a second end;
    an outlet duct connected at a first end to the reciprocating internal combustion engine, wherein exhaust gases are discharged from the reciprocating internal combustion engine into the environmental atmosphere through a second end;
    a first communication duct connected to the inlet duct at a first junction point and connected to the outlet duct at a second junction point to have the air being mixed with the exhaust gases thereof;
    an exhaust duct which branches off of the outlet duct at a first end coinciding with the second junction point, wherein the exhaust duct connects the outlet duct with the environmental atmosphere at a second end and includes a control valve;
    a first turbine positioned in a bypass line connecting to the inlet duct at a first point and a second point wherein the first turbine is coupled to a dissipation system;
    a bypass valve arranged in the inlet duct between the first point and the second point, wherein the bypass valve and the first turbine are controlled to obtain a desired pressure and airflow value in the inlet duct;
    a heat exchanger in the outlet duct for cooling the exhaust gases; and
    a turbocharger positioned in the outlet duct downstream of the heat exchanger, wherein the turbocharger is charged by turbocharger charging means, to control, together with the first turbine and the bypass valve, the pressure of the intake air and the intake airflow;
    a first three-way valve further including
        a first port receiving air from the environmental atmosphere at the inlet duct upstream of the bypass valve,
        a second port which directs the air to an inlet of the first turbine, and
        a third port sending air to the outlet duct upstream of the turbocharger through a second communication duct;
    an on/off valve positioned in the outlet duct between the heat exchanger and a point of connection of the outlet duct with the second communication duct;
    a second three-way valve positioned in the outlet duct downstream of the turbocharger, further including
        a first port receiving at least one of the air and the exhaust gases discharged from the turbocharger,
        a second port sending air to the outlet duct between the heat exchanger and the on/off valve, through a bypass duct,
        a third port discharging the exhaust gases to the second end of the outlet duct;
    a section of the outlet duct that connects the heat exchanger with the first communication duct between the first junction point and the second junction point;
    wherein the configuration of the first three-way valve, the second three-way valve, the bypass valve, the control valve and the on/off valve allows use of the device for increasing or reducing air pressure with respect to environmental atmospheric air.

2. The device according to claim 1, further comprising a muffler at the second end of the outlet duct.

3. The device according to claim 1, further comprising a muffler at the second end of the exhaust duct.

4. The device according to claim 1, further comprising the first turbine being coupled to a radial flow centrifugal compressor, wherein the radial flow centrifugal compressor draws air from the environmental atmosphere through a filter and discharges air to the environmental atmosphere through a muffler, wherein a back pressure valve is positioned between the radial flow centrifugal compressor and the muffler.

5. The device according to claim 1, wherein the the first turbine is coupled to an electric generator.

6. The device according to claim 1, wherein the first turbine is a variable-geometry turbine.

7. The device according to claim 6, wherein the variable-geometry turbine is a radial centripetal-type turbine.

8. The device according to claim 1, wherein the turbocharger charging means are selected from an electric motor and a second turbine.

9. The device according to claim 1, further comprising a filter at the second end of the inlet duct.

10. The device according to claim 1, further comprising at least one condensate separator.

11. A method of operating a device for testing a reciprocating combustion engine in different atmosphere conditions according to claim 1, wherein the method comprises the steps of:

admitting an amount of inlet air from environmental atmosphere into the second end of the inlet duct;

varying a pressure of the inlet air;

diverting the inlet air to the outlet duct through the first communication duct to put the exhaust gases in direct communication with the inlet air;

introducing the inlet air subjected to the pressure variation to the intake of the reciprocating internal combustion engine being tested;

reducing a temperature of the exhaust gases via the heat exchanger prior to entry into the turbocharger in the outlet duct; and expelling the exhaust gases from the reciprocating internal combustion engine being tested into the atmosphere;

wherein the step of varying the pressure of the inlet air admitted from the environmental atmosphere is performed by a combined action of the turbocharger, the first turbine and the bypass valve controlling the amount of inlet air.

12. The method according to claim 11, wherein the step of varying the inlet air pressure simulates height variations of +/−200 m with respect to the height at which the method is carried out.

13. The method according to claim 11, wherein the step of varying the inlet air pressure comprises reducing the inlet air pressure.

14. The method according to any of claim 11, wherein the step of varying the inlet air pressure comprises increasing the inlet air pressure.

15. The method according to any of claim 11, further comprising a step of:
switching between an inlet air pressure increase mode and an inlet air pressure reduction mode,
wherein step of said switching of the pressure variation mode is carried out by adjusting the first three-way valves, the second three-way valve, the bypass valve, the control valves and the on/off valve.

16. The method according to claim 11, further comprising a step of:
varying a temperature of the inlet air.

* * * * *